UNITED STATES PATENT OFFICE.

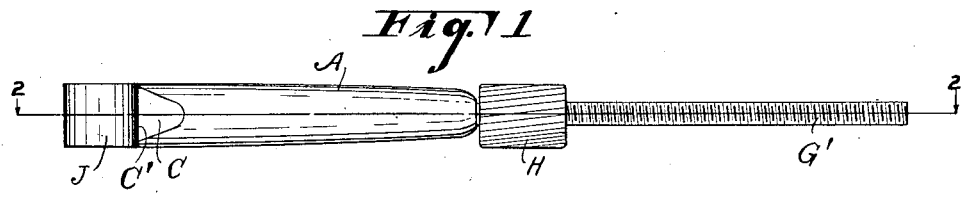
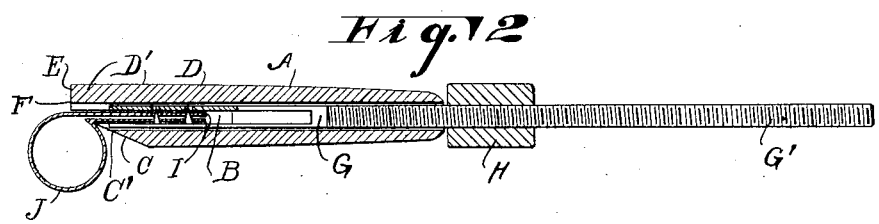
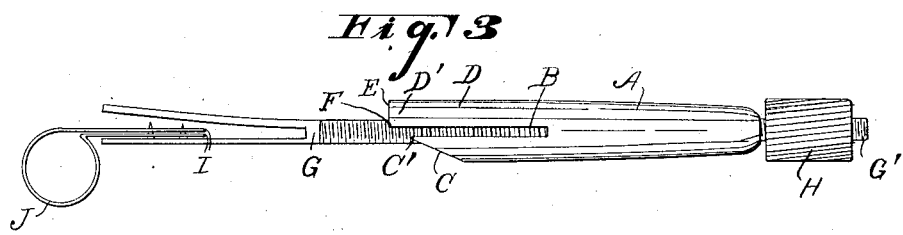
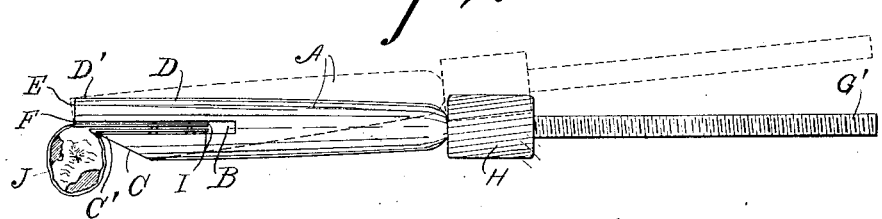
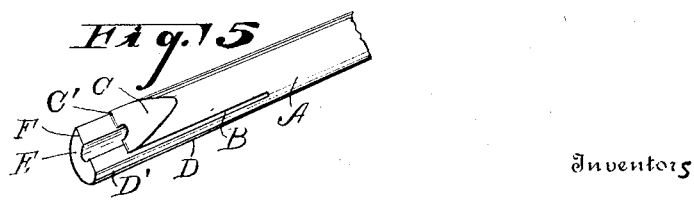

LOUIS P. WAGNER, OF MILWAUKEE, WISCONSIN.

COMBINATION INLAY AND ORTHODONTIA CLAMP.

1,348,257. Specification of Letters Patent. Patented Aug. 3, 1920.

Application filed January 2, 1919. Serial No. 269,239.

*To all whom it may concern:*

Be it known that I, LOUIS P. WAGNER, a citizen of the United States, residing at Milwaukee, county of Milwaukee, and State of Wisconsin, have invented new and useful Improvements in Combination Inlay and Orthodontia Clamps, of which the following is a specification.

My invention relates to improvements in dental clamps, with particular reference to that class of clamps known as orthodontia clamps.

The object of my invention is to provide means whereby the holder may be adjusted to the tooth and supported substantially at a tangent to a circle within which the tooth projects, the holder tending to remain in such position with considerable stability, instead of projecting outwardly from the tooth at right angles to the jaw, and in a loosely swinging position, as has heretofore been the case. In the clamps of this type, as heretofore constructed, the holder tends to assume a position at right angles to the jaw, but freely swings from side to side under pressure, and greatly interferes with the work of the dentist. This is particularly true in orthodontia work where it is necessary to hold the end portions of the band in actual contact with each other while the band is being drawn around the tooth and adjusted and shaped preparatory to the soldering operation. It is well known that orthodontia bands must have their ends thus soldered together in order to utilize them as an anchorage for retaining bows or other tension or compression members which draw or press the tooth in place. My improved holder differs from those employed in inlay work, and commonly known as matrix holders, in that my holder is adapted to draw the end portions of the band together while the band is being conformed to the tooth, and hold them together along tangential lines with one of the end portions bent at an acute angle, contacting with the tooth in close proximity to the apex of such angle on one side thereof and with the opposing end portion on the opposite side thereof while the band is being conformed to the tooth, whereas in holders for inlay bands or matrices this is not at all essential, and the ends of a matrix band are ordinarily quite widely separated, it being merely necessary that the part of the band which crosses the cavity shall be drawn into conformity with the tooth. But my improved holder also differs from the orthodontia clamps heretofore used in that it is adapted to fulcrum on the tooth with the holder extending substantially at a tangent to the surface upon which it fulcrums, after which the holder may be swung through an angle of nearly 90°, and caused to exert a powerful drawing pressure upon the bands. The holder will then retain its position with considerable stability during the next burnishing operations, and in this respect also it differs from the holders heretofore used in orthodontia work. The swinging movements also tend to displace and distort a temporary filling, such as wax when the clamp is used for inlay work, so that perfect contours and absolute conformity to a cavity in a tooth, or its root, are not obtainable.

My improvement, however, enables me to secure perfect conformity, and to retain such conformity and perfect contour by reason of the stability with which the holder is supported, the facility with which the ends of the band can be drawn together preparatory to soldering them, and, further, by reason of the fact that the holder is supported in a position where it will interfere to a minimum extent with the work of the dentist.

A further, although secondary, object of my invention is to provide means whereby the holder may be operated as a lever to draw a band tightly around a tooth, in order to press a wax filling forcibly into proximal cavities, and thus secure a perfect pattern from which a filling or inlay may be formed. My invention is also serviceable for pressing amalgam into such cavity, in order to fill the latter, and secure perfect conformity to all portions of the cavity, and perfect exterior contouring work.

Further, in taking a wax impression of a narrow necked tooth, I am enabled to utilize my holder as a lever, and thus draw a flexible band around the neck of the tooth at the gingival margin, the surplus wax being squeezed out, and removed.

In the drawings:—

Figure 1 is a view of my improved clamp as seen from the inner side, i. e., the side having the beveled surface.

Fig. 2 is a sectional view on line 2—2 of Fig. 1.

Fig. 3 is a detail view, showing the parts in band releasing position.

Fig. 4 is a plan view showing the clamp in use.

Fig. 5 is an end view of the clamp.

Like parts are identified by the same reference characters throughout the several views.

The shank A of the holder may be of any ordinary construction. At its working end it is provided with a slot B, at one side of which the holder is provided with a beveled surface C, forming a comparatively sharp edge at C' at the junction of this beveled surface with one wall of the slot. At the opposite side of the slot, the holder is substantially semi-cylindrical in form, as shown at D, and this semi-cylindrical portion extends beyond the edge C' of the beveled portion C, and terminates in an end surface or shoulder E, at right angles to the axis of the tool, thereby forming a fulcrum edge at F, which lies substantially in the plane of the beveled surface C, projected across the slot.

Within the holder an ordinary split rod G serves as a clamping member, the rear end of the rod being screw threaded, as indicated at G', whereby the rod may be actuated by means of a sleeve nut H at the rear end of the holder. The clamp J is manipulated in a manner familiar to dentists using orthodontia clamps. A flexible band of silver, or other suitable metal, is bent upon itself, and its ends inserted between the forked end of the clamp G, after which the clamp is drawn backwardly by means of the sleeve nut H acting upon its threaded shank, and the ends of the band I are thus drawn into the holder, with the side margins of the band engaged in the slot B. The intermediate portions of the band may then be separated by any suitable tool, and shaped to receive the tooth to which the band is to be applied.

After the band I has been applied to the tooth, a further retraction of the screw shank G' draws it about the tooth, or about the neck thereof, after which operations may be performed within the band which constitutes a wall about the tooth to retain wax or other material in cavities which extend through the side walls of the tooth.

Owing to the fact that the holder is beveled, as shown at C, on only one side of the slot, whereas the holder on the other side extends forwardly and forms a fulcrum shoulder at E, substantially in a plane common to the beveled surface, it is obvious that the holder can be used as a lever by swinging it outwardly from its normal position, toward a position at right angles to the jaw, whereby the end portion of the band which extends over the shoulder C' will be drawn around the tooth, and in fact both ends of the band will be drawn tightly around the tooth, for the reason that the mouth of the slot tends to move away from the tooth during such an operation.

If this lever action takes place after the space between the band and the tooth, or its neck, or between the band and the inner wall of a proximal cavity, has been filled with wax, it is obvious that the wax will be pressed firmly into the cavity, or if the wax encircles the neck of the tooth, it will be pressed firmly into conformity to the neck on all sides.

It is also obvious that, owing to the fact that the shoulder E lies substantially in the plane of the beveled surface C, the holder will tend to assume a position tangential to the circle, or circular line occupied by the band around the tooth when the sleeve nut H is adjusted to draw the holder into forcible contact or close contact with the tooth.

It will be understood that the important feature of my invention consists in extending the holder at one side of the slot farther than it extends on the other side, and also in having the extension terminate in a fulcrum shoulder; also in having the opposite side of the tool beveled in a plane substantially including the fulcrum shoulder.

Owing to the fact that the end of the extension D' of the portion D of the holder is cut square across, thereby providing an end wall E substantially at right angles to the plane of the slot, a flat bearing surface is provided for contact with the tooth, or its encircling band, upon completion of the drawing operation developed by the oscillation of the lever. This is a limiting factor of considerable importance, although it does not limit the ultimate possible drawing action, for the reason that the tool can be readjusted and the clamp retracted, after an initial operation of the lever, in order to draw the band I farther into the slot B, preparatory to a second manipulation of the lever. The necessity for this, however, will seldom occur in practice.

Another advantage secured by the extension of the semi-cylindrical portion D is that it facilitates burnishing operations along the meeting portions of the band, and in the vicinity thereof, the burnishing tool being passed over the shoulder C', and drawn into the slot, or partially into the slot, along the inner face of the extension, the opposite face of the burnishing tool being pressed by the holder against the tooth, the holder being used as a lever. The tangential position of the holder also facilitates a similar burnishing operation on the opposite side, the burnishing tool being interposed between the beveled surface and the tooth.

I claim:—

1. A beveled clamp for banding teeth, comprising the combination with an adjustable band engaging clamp, a holder adapted to receive the clamp, and provided with an open ended slot into which a band engaged by the clamp may be drawn, said holder having a beveled surface at one side, converging in the direction of the slot, and a fulcrum shoulder on the other side, substantially in a plane common to the beveled surface.

2. A holder for an orthodontia clamp, having a slotted end, adapted to receive both ends of a flexible tooth encircling band, means for clamping the band ends together, and an extension at one side of the slot adapted to serve as a fulcrum to facilitate drawing the band tightly about the tooth.

3. A holder for an orthodontia band, having means for clamping together the ends of a flexible tooth encircling band, said holder having means for forming an acute angle bend in one end portion of the band and holding such end portion adjacent the apex of the angle in contact with a tooth on one side and in contact with the other end portion on the other side.

In testimony whereof I affix my signature in the presence of two witnesses.

LOUIS P. WAGNER.

Witnesses:
LEVERETT C. WHEELER,
O. C. WEBER.